(12) United States Patent
Lin et al.

(10) Patent No.: US 7,388,909 B2
(45) Date of Patent: *Jun. 17, 2008

(54) INITIALIZATION METHOD FOR A NETWORK SYSTEM

(75) Inventors: Hou-Wei Lin, Taipei (TW);
Shieh-Hsing Kuo, Taipei (TW);
Meng-Han Hsieh, Changhua County (TW); Kuang-Yu Yen, Taichung (TW)

(73) Assignee: Realtek Semiconductor Corp., Hsinchu (TW)

( * ) Notice: Subject to any disclaimer, the term of this patent is extended or adjusted under 35 U.S.C. 154(b) by 908 days.

This patent is subject to a terminal disclaimer.

(21) Appl. No.: 10/698,530

(22) Filed: Nov. 3, 2003

(65) Prior Publication Data

US 2004/0090981 A1    May 13, 2004

(30) Foreign Application Priority Data

Nov. 7, 2002   (TW) ............................... 91132822 A

(51) Int. Cl.
*H04B 1/10*   (2006.01)
(52) U.S. Cl. ...................... 375/231; 375/340; 375/232; 375/222

(58) Field of Classification Search ................ 375/229, 375/230, 231, 232, 233, 340, 222, 219, 345, 375/350, 220, 286, 276; 370/201, 437, 453
See application file for complete search history.

(56) References Cited

U.S. PATENT DOCUMENTS

| | | | |
|---|---|---|---|
| 6,201,796 B1 * | 3/2001 | Agazzi et al. | 370/286 |
| 6,310,909 B1 * | 10/2001 | Jones | 375/220 |
| 6,477,200 B1 * | 11/2002 | Agazzi et al. | 375/233 |
| 6,590,930 B1 | 7/2003 | Greiss | |
| 6,754,262 B1 * | 6/2004 | Citta et al. | 375/232 |
| 6,977,977 B1 * | 12/2005 | Dubrovin et al. | 375/346 |
| 7,027,504 B2 * | 4/2006 | Yousef et al. | 375/234 |
| 7,203,256 B2 | 4/2007 | Lin et al. | |
| 2002/0131488 A1 * | 9/2002 | Allpress et al. | 375/233 |
| 2003/0112860 A1 * | 6/2003 | Erdogan | 375/229 |

* cited by examiner

*Primary Examiner*—Chieh M. Fan
*Assistant Examiner*—Aristocratis Fotakis
(74) *Attorney, Agent, or Firm*—Bacon & Thomas, PLLC

(57) ABSTRACT

An initialization method for a network system is disclosed, which uses a channel estimation to predetermine coefficients of an FFE and an FBE. As such, convergence of the FFE, the FBE, a timing recovery, an echo canceller and a NEXT canceller is speeded up. Also, interaction of the cited devices and a divergence caused by the interaction are avoided. Therefore, system performance and stability are increased.

23 Claims, 6 Drawing Sheets

SNR(dB)=10*log10(snr_o)

INITIALIZATION METHOD FOR A NETWORK SYSTEM

BACKGROUND OF THE INVENTION

1. Field of the Invention

The present invention relates to an initialization method for a network system and, more particularly, to an initialization method adaptive for a Gigabit Ethernet system.

2. Description of Related Art

For an Ethernet system, a receiver to accurately receive data at a receiving-end may include the following devices: a feed-forward equalizer (FFE), a feed-back equalizer (FBE), a timing recovery (TR), an ECHO canceller, an NEXT (Near-End-Cross-Talk) canceller, etc. In order to find the appropriate coefficients of the devices, the conventional method, which is known to be a data-directed approach, is that the transceiver of the transmitting-end transmits signals known by both ends to the transceiver of the receiving-end and the appropriate coefficients for the devices of the receiving-end are determined according to the receiving known signals.

However, according to the IEEE 802.3ab standard, a decision-directed approach is introduced to determine and/or adjust the appropriate operating coefficients of the devices. When determining the appropriate operating coefficients of the devices, the receiving signals are unknown by the receiving-end in advance. However, since the operation of the devices may have interaction to each other when determining the coefficients, the determined coefficients of the devices may not be converged to an appropriate value. Thus, signals transmitted by the transceiver cannot be received.

To solve the aforementioned problem, the functions of some function blocks are simplified or the coefficients of some function blocks are fixed. In this manner, the interaction between functional blocks is reduced and the time for convergence of each functional block is reduced. However, the determined coefficients may not be optimized. In U.S. Pat. No. 6,201,831, Inter-Symbol-Interference (ISI) is divided into a precursor and a postcursor caused by a pulse-shaping filter on the transmitting-end and the channel response respectively. Accordingly, an inverse partial response filter (IPR) and a decision feedback sequence estimator (DFSE) on the receiving-end are used to eliminate the precursor and the postcursor respectively in turn. However, in practice, the ISI, especially the precursor, still exists when the conventional art is applied. Thus, the performance of the initialization of the Gigabit Ethernet system needs to be further improved.

Therefore, it is desirable to provide an improved initialization method for a Gigabit Ethernet system to mitigate and/or obviate the aforementioned problems.

SUMMARY OF THE INVENTION

An object of the present invention is to provide an initialization method for a Gigabit Ethernet system, which the initial coefficients of a feedforward equalizer (FFE) and a feedback equalizer (FBE) are predetermined through channel estimation technique to speed up convergence of all function blocks.

Another object of the present invention is to provide an initialization method for a Gigabit Ethernet system, which pre-estimates coefficients of a feedforward equalizer (FFE) and a feedback equalizer (FBE) using channel estimation to avoid divergence caused by interaction of function blocks and accordingly increasing system performance and stability.

To achieve the object, the present invention provides an initialization method for use in a communication system having a plurality of transceivers, wherein the transceivers includes a master transceiver and a slave transceiver coupled to the master transceiver via a channel, each of the transceivers respectively having a noise canceller system, a timing recovery, and a equalizer system, the method comprising: executing a first stage comprising the steps of transmitting a first idle sequence by the master transceiver, executing signal detection and channel estimation by the slave transceiver, determining a plurality of initial coefficients of the equalizer system of the slave transceiver according to the result of channel estimation, and training the timing recovery in both frequency and phase and the equalizer system of the slave transceiver; executing a second stage comprising the steps of transmitting a second idle sequence by the slave transceiver, executing signal detection and channel estimation by the master transceiver, determining a plurality of initial coefficients of the equalizer system of the master transceiver according to the result of channel estimation, and training the timing recovery in phase, the equalizer system, and the noise canceller system of the master transceiver while training the noise canceller system of the slave transceiver; and executing a third stage comprising the steps of training the timing recovery in phase, the equalizer system of the master transceiver while training the timing recovery in both frequency and phase and equalizer system of the slave transceiver.

Other objects, advantages, and novel features of the invention will become more apparent from the following detailed description when taken in conjunction with the accompanying drawings.

DETAILED DESCRIPTION OF THE PREFERRED EMBODIMENT

Figure 1A:
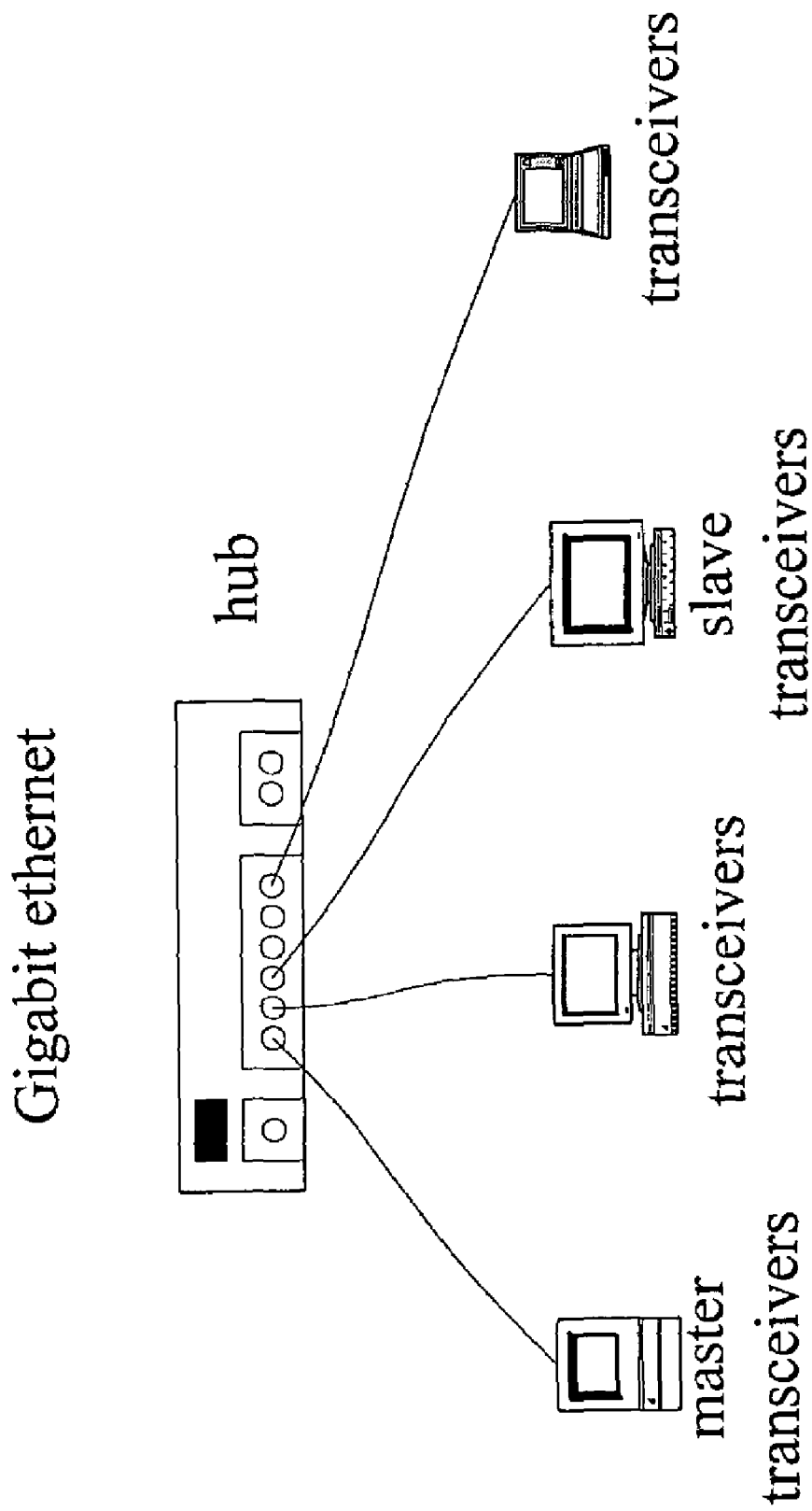
FIG. 1A is a diagram of a system operation configuration of a Gigabit Ethernet transceiver according to the invention.
Figure 1B:
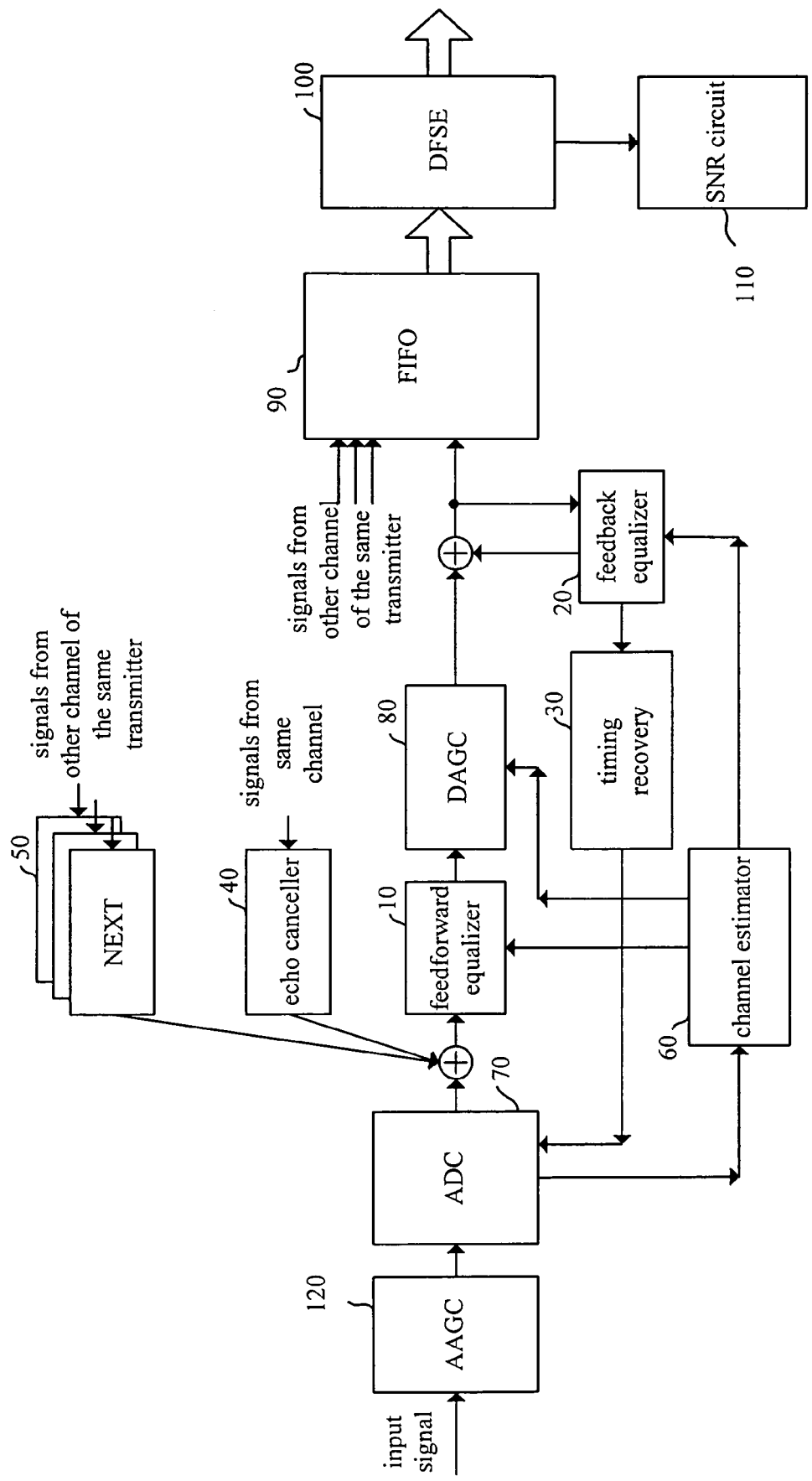
FIG. 1B is a diagram of architecture of a Gigabit Ethernet system with an initialization method according to the invention.

Please refer to FIG. 1A, which shows a configuration of a Gigabit Ethernet system. In FIG. 1A, the system includes a plurality of transceivers having a master transceiver and a slave transceiver. FIG. 1B shows an architecture of a receiver system of the master/slave transceiver. The master transceiver transmits data using an independent clock signal, which is fixed in both frequency and phase. The slave transceiver synchronizes both the frequency and the phase of its receive and transmit clock signals to the signal received from the master. As shown in FIG. 1B, the receiver is formed by a feedforward equalizer (FFE) 10, a feedback equalizer (FBE) 20, a timing recovery 30, an echo canceller 40, a near end cross talk (NEXT) canceller 50, a channel estimator 60, an analog-to-digital converter (ADC) 70, a digital automatic gain controller (AGC) 80, a first-in-first-out (FIFO) register 90, and a decision feedback sequence estimator (DFSE) 100. The ADC 70 is to receive an analog signal and to convert the signal into a digital signal. The FFE 10 is to eliminate a precursor of the inter-symbol-interference (ISI). The FBE 20 is to eliminate a postcursor ISI component. The timing recovery 30 is to synchronize the frequency and the phase of the clock signal of a transmitting-end and a receiving-end.

The echo canceller 40 is to eliminate an echo effect caused by a same transceiver on transmission. The NEXT canceller 50 is to eliminate a cross-talk effect caused by a same transceiver on transmission. The channel estimator 60 is to estimate the length and/or other characteristics of a channel between the master/slave transceivers and to preset coefficients of the FFE 10, the FBE 20 and an analog AGC 120 according to the estimated channel characteristics, and thus the convergence of the functional blocks can be speeded up.

The digital AGC 80 coupled to the FFE 10 is to adjust the magnitude of an output signal of the FFE 10 to match an operating range of the FIFO register 90. The FIFO register 90 coupled to the digital AGC 80 is to compensate the timing difference between the digital AGC 80 and the DFSE 100. The DFSE 100 coupled to the FIFO register 90 is to decode and to eliminate the postcursor component of ISI.

Figure 2:
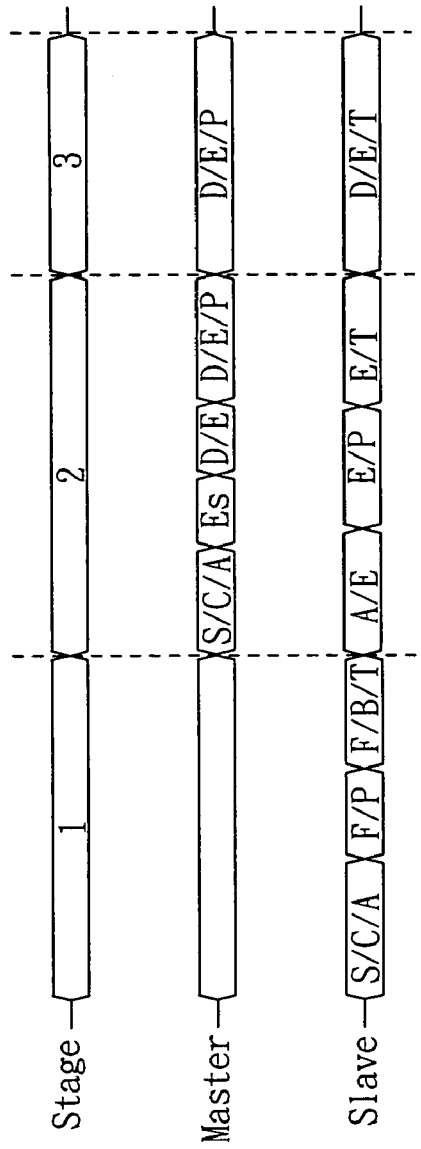
FIG. 2 is a timing diagram of the initialization method according to the invention.
Figure 3:
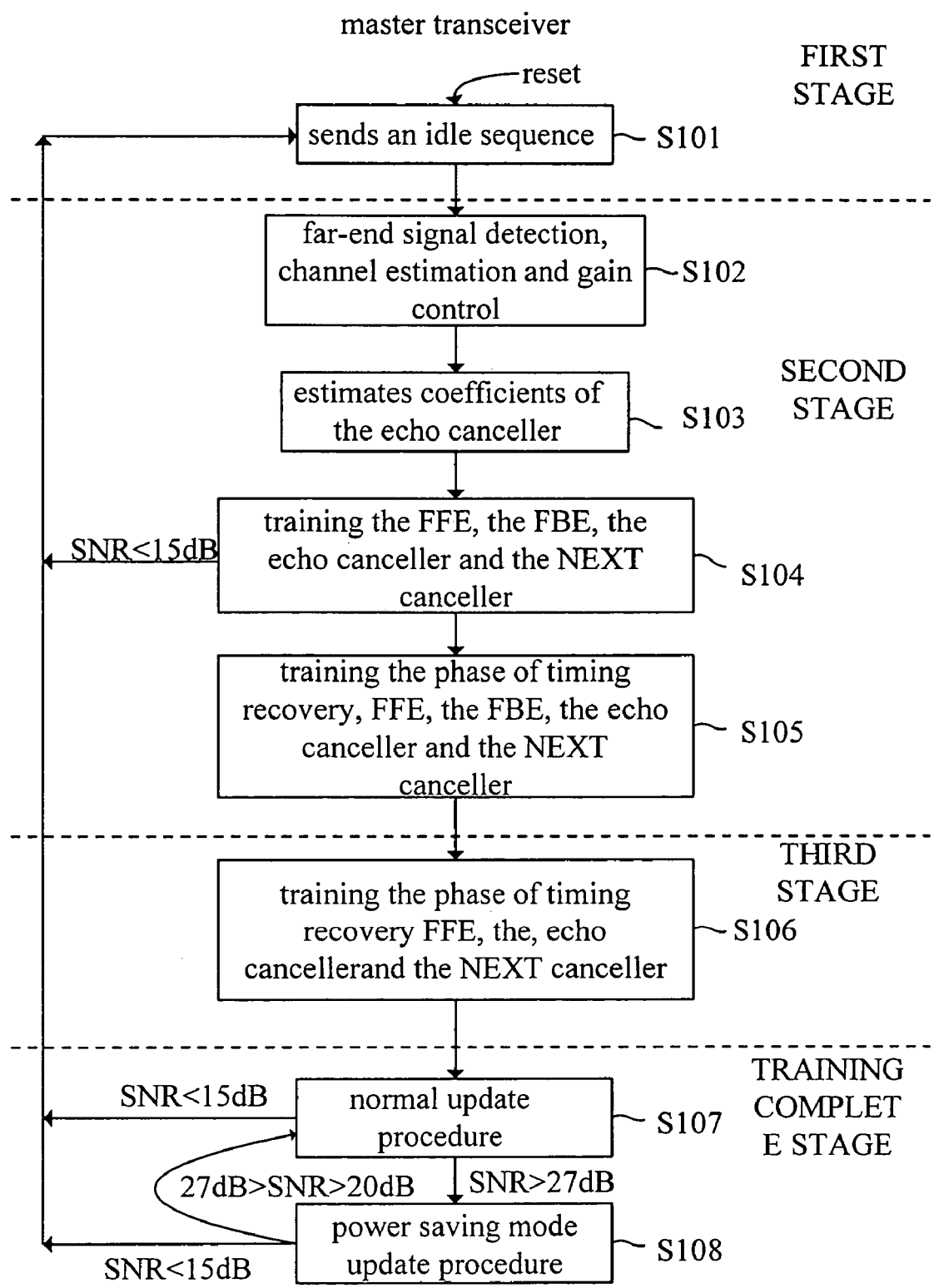
FIG. 3 is an operating flowchart of a master transceiver used in the initialization method according to the invention.
Figure 4:
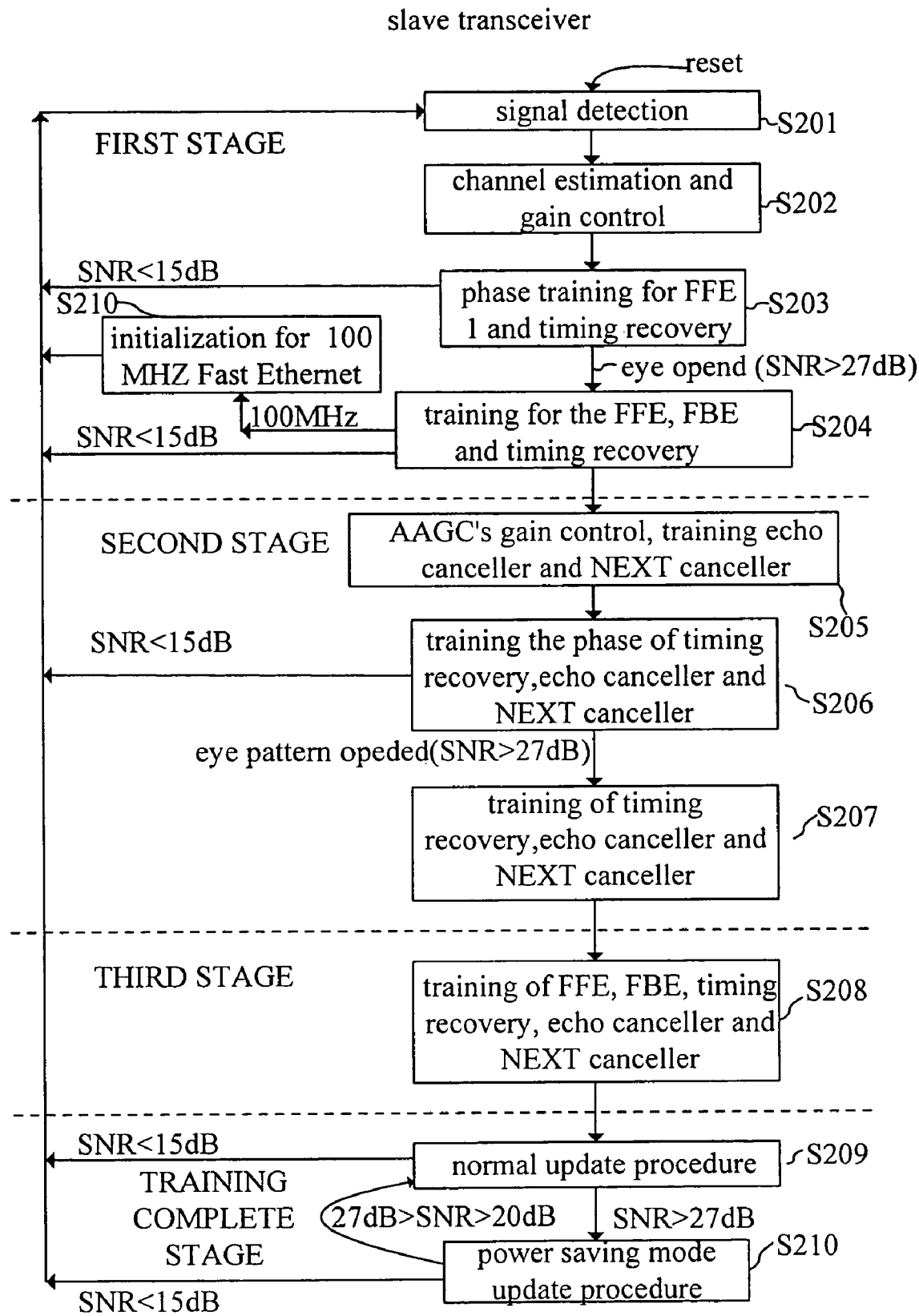
FIG. 4 is an operating flowchart of a slave transceiver used in the initialization method according to the invention.

FIG. 2 shows a timing diagram of the initialization method disclosed in the embodiment of the present invention. The initialization method disclosed in the embodiment of the present invention is based on FIG. 40—15 of IEEE Std 802.3ab-1999. Accordingly, a startup procedure is divided into three stages: At a first stage, the master is in a half-duplex mode which transmits a signal but does not receive any signal and the slave is also in a half-duplex mode which receives the signal from the master but does not transmit any signal, at a second, the slave is in a half-duplex mode which transmits a signal but does not receive any signal and the master is also in a half-duplex mode which receives the signal from the master but does not transmit any signal, and at a third stages, the both master and slave transceiver are trained in a full-duplex mode. Please refer to FIGS. 2, 3, and 4. FIG. 3 shows an operating flowchart of a master transceiver used in the initialization method according to the embodiment of the present invention. FIG. 4 shows an operating flowchart of a slave transceiver used in the initialization method according to the embodiment of the present invention.

First Stage

In step S101, the master transceiver sends an idle sequence to train the FFE 10, FBE 20 and timing recovery 30 of the respective slave transceiver. However, the master transceiver does not train the echo canceller 40 and NEXT canceller 50 of itself at this stage. This is because coefficients of the cancellers 40 and 50 are changed with the gain and the timing sequence of the AGC 120 of the master transceiver. Since the gain and the timing sequence of the AGC 120 may be changed at the following stage, it is meaningless to determine the coefficients of the cancellers 40 and 50. In addition, a symbol duration of the master transceiver is divided into 64 phases and any one of the phases can be chosen as an initial phase.

In step S201, the slave transceiver is silent without transmitting data. The slave transceiver has to perform signal detection to start the other circuits of the physical layer (PHY). In this manner, it can be sure that the proceeding training of the slave transceiver is performed with far-end signals. Thus, the step S201, far-end signal detection is performed as soon as the step of resetting is executed. The far-end signal detection is accomplished through getting the absolute values of the received signals first and then averaging the absolute values of the received signals. When the average value is larger than a predetermined threshold, it means that there is a far-end signal received by the slave transceiver.

As shown in FIG. 1B, the performance of the entire system can be determined by the effective bit number (Enob) of the ADC 70. Therefore, the analog automatic gain controller (AAGC) 120 for adjusting the range of the signal inputted into the ADC 70 is important, which is required not to be affected by the line (or channel) length or the far-end driving capability. As such, the dynamic operating range of the ADC 70 can match the range of the input signal, thereby a clipping effect can be avoided and the Analog Automatic Gain Controller (AAGC) can be implement easily. The following equation is typically used to implement the required function:

$$acc(n+1)=acc(n)+(rx\_signal(n)-thd),$$

where rx_signal is the received signal, acc is the output of the AAGC 120, and thd is a threshold. When acc is larger than the threshold, the AAGC 120 is adjusted downwardly. When acc is smaller than the threshold, the AAGC 120 is adjusted upwardly. Accordingly, the operating range of the AAGC 70 and the range of the input signal are matched.

However, the value thd has to be changed with the change of the line length to accomplish the range matching. In the initialization method disclosed in the embodiment of the present invention, the initial coefficients of the FFE 10 and the FBE 20 are "predetermined" before training the FFE 10 and the FBE 20. The appropriate initial coefficients of the FFE 10 and the FBE 20 are determined through channel estimation. That is, through checking the look-up-table or calculating the corresponding relationship between the coefficients of the equalizers 10 and 20 and the channel characteristics, i.e. line (channel) length, according to the acquired characteristics of the line (or channel), the appropriate initial coefficients of the equalizers 10 and 20 can be determined. The apparatus for ethernet channel estimation and the method thereof are disclosed in copending patent application Ser. No. UNKNOWN entitled "ETHERNET CHANNEL ESTIMATION DEVICE AND METHOD" which assigned to the same assignee, the contents of which are incorporated by reference herein.

In step S202, the channel estimation and the gain control are performed by the slave transceiver. The threshold thd of the AAGC 120 and the appropriate initial coefficients of the equalizers 10 and 20 are dynamically and respectively set with reference to estimated channel characteristics, such as line (or channel) length.

In step S203, the convergence of the FFE 10 and the phase training of the timing recovery 30 of the slave transceiver are executed. Because the appropriate initial coefficients of the FFE 10 are predetermined in the step S202, the coefficients of FFE 10 are converged quickly such that an eye-pattern is opened in a short time (i.e., SNR greater than a predetermined value). Otherwise, the procedure returns to step S201.

In step S204, the frequency and phase training of the timing recovery 30 and the convergence of the FFE 10 and FBE 20 of the slave transceiver are executed. Because the coefficients of FFE 10 are converged in step S202, the coefficients of the FBE 20 are converged quickly since the interaction between the FFE 10 and FBE 20 is effectively avoided. In addition, since the phase of the timing recovery 30 is trained, the frequency of the timing recovery 30 is synchronized quickly. After the FFE 10, FBE 20 and timing recovery 30 are converged, the slave transceiver sends an idle sequence to the master transceiver. Because the FFE 10, FBE 20 and timing recovery 30 are converged, the slave transceiver is synchronized to the master transceiver. If any of the FFE 10, FBE 20 and timing recovery 30 is not converged, the slave transceiver will execute the steps of the first stage again.

In step S204, when the slave transceiver is implemented as a 100 MHZ Fast Ethernet chip, step S210 is performed to process a corresponding initialization for the 100 MHZ Fast Ethernet.

When the coefficients of FEE 10, FBE 20 and timing recovery 30 of the slave transceiver are converged, the procedure proceeds to the second stage. In this embodiment, the time period for executing the first stage is fixed to be shorter than 350 ms. However, the time to transit from the first stage to the second stage may be varied depends on when the slave transceiver start to send an idle sequence to the master transceiver.

Second Stage

After the FFE 10, FBE 20, and timing recovery 30 of the slave transceiver are converged at the first stage, the master/slave transceivers enter the second stage. At the second stage, the slave transceiver sends an idle sequence to the master transceiver. Also, the master transceiver has to execute step S102 to perform signal detection to initiate the other circuits of the PHY to ensure following training for the master transceiver to be operated with a far-end signal. Thus, the gain of the AAGC in the master transceiver may be adjusted to a appropriate to receive the far-end signal. The far-end signal detection is accomplished through getting the absolute values of the received signals first and then averaging the absolute values of the received signals. When the average value is larger than a predetermined threshold, it means that there is a far-end signal received by the master transceiver.

In step S102, when the far-end signal is detected, channel estimation and gain control is performed. A threshold thd of the AAGC 120 and appropriate initial coefficients of the equalizers FFE 10 and FBE 20 in the master transceiver are dynamically and respectively set.

In step S103, the master transceiver estimates coefficients of the echo canceller 40 using the features of normalization and more training symbols on the Gigabit Ethernet initialization. The coefficient estimation OF EACHO CANCELLER 40 is expressed as follows:

$$Eh(D) = E[Rx(D) \cdot Td(D)] \quad (1)$$
$$= E[(Eh(D) \cdot Td(D) + Ch(D) \cdot Rd(D) + N(D)) \cdot Td(D)]$$

where Rx(D) is received input signal, Eh(D) is echo channel response, Td(D) is transmitted data, Ch(D) is transmission channel response, Rd(D) is far-end transmitted data, and N(D) is noise.

Because Td(D) and Rd(D) are uncorrelated with N(D) and Td(D) is an independent identical signal, the ensemble average is used to replace the expectation operation for a desired echo channel response. Accordingly, equation (1) is re-written as follows.

$$Eh = \frac{\sum_{i=1}^{N} Rx(i) \cdot Td(i)}{N} \quad (2)$$

$$Eh_{i+1} = Eh_i + \frac{1}{N} \cdot Rx(i) \cdot Td(i) \text{ for } 1 \leq i \leq N$$

Figure 5:
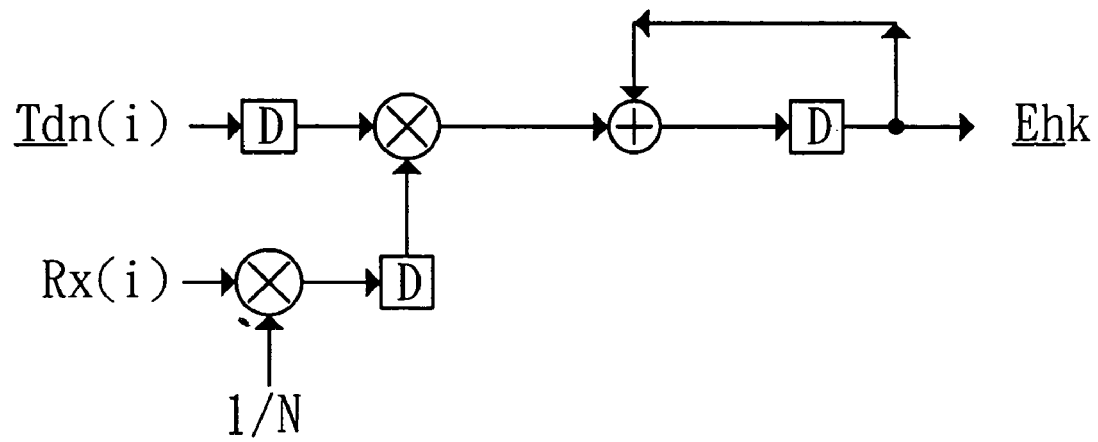
FIG. 5 is a circuit diagram of a coefficient estimator for an echo canceller used in the initialization method according to the invention.

The equation (2) is thus implemented by a circuit shown in FIG. 5. The circuit can predict and accordingly preset coefficients of the echo canceller 40 to speed up the system convergence on the Gigabit Ethernet initialization.

Since the clock signal of the slave transceiver and the master transceiver are synchronized. The slave transceiver sends an idle sequence according to the synchronized clock signal such that the frequency of the clock signal for a transmitter and a receiver in the master transceiver are the same. However, the phase of the clock signal for a transmitter and a receiver in the master transceiver may not be the same. Therefore, when the channel estimation is performed to predetermined a set of coefficients for the master transceiver's FFE 10 and FBE 20, there may be a specific phase range of the master transceiver's clock signal. Accordingly, the master transceiver's FFE 10, FBE 20, echo canceller 40, and NEXT canceller 50 are converged and the eye-pattern is opened in a short time.

In step S104, the master transceiver trains the FFE 10, the FBE 20, the echo canceller 40 and the NEXT canceller 50 by the fixed phase selected in the step S101, with reference to the coefficients of the equalizers FFE 10 and FBE 20 estimated by step S102 and the coefficients of the echo canceller 40 estimated by step S103. Therefore, the FFE 10, the FBE 20, the echo canceller 40, and the NEXT canceller 50 are converged quickly to appropriate values such that the eye-pattern is opened in a short time. After the eye-pattern is opened (i.e., the SNR is greater than a predetermined value), the procedure enters step S105. Otherwise, the procedure returns to step S101. When procedure is back to step S101, the master transceiver selects a next 7 phase, i.e., phase=phase+7, as the initial phase and repeats the procedures of steps S102, S103 and S104.

In step S105, phase training of the master transceiver's timing recovery 30 and the convergence of the FFE 10, the FBE 20, the echo canceller 40, and the NEXT canceller 50 are simultaneously executed. (except for the frequency training of the timing recovery 30). When the master transceiver's FFE 10, FBE 20, the phase of the timing recovery 30, echo canceller 40, and NEXT canceller 50 are converged, the following step S106 is executed, otherwise, the step S101 is returned to.

In step S205, because the slave transceiver sends the idle sequence at the second stage, the signal energy is different from that at the first stage. Thus, the gain of AAGC 120 must to be adjusted again to obtain an acceptable input dynamic range. The slave transceiver trains the coefficients of the FFE 10, FBE 20, and timing recovery 30 to converge in the first stage and then trains the coefficients of the echo canceller 40 and NEXT canceller 50 to converge in the second stage. When the echo canceller 40 and the NEXT canceller 50 are trained, the channel characteristics are regarded to be time-invariant. Therefore, coefficients of the FFE 10 and the FBE 20 need to be fixed to avoid interaction among the FFE 10, the FBE 20, the echo canceller 40, and the NEXT canceller 50.

In step S206, phase training of the timing recovery 30 is added. As such, training is performed only on the phase of the echo canceller 40, the NEXT canceller 50 and the timing recovery 30. Because the training of the echo canceller 40, the NEXT canceller 50, and the phase of the timing recovery 30 are not in interaction with the FFE 10 and the FBE 20 such that the coefficients of the echo canceller 40, the NEXT canceller 50, and the phase of the timing recovery 30 can be converged quickly and the eye-pattern is opened in a short time. After the eye-pattern is opened (i.e., the SNR is greater than a predetermined value), the following step S207 is executed. Otherwise, the step S201 is returned to.

In step S207, the convergence of the echo canceller 40 and the NEXT canceller 50 and the phase and the frequency training of the timing recovery 30 are executed. When the echo canceller 40, the NEXT canceller 50, and the timing recovery 30 are converged, the following step S208 is executed, otherwise, step S201 is returned to.

In this embodiment, the time period for executing the second stage is fixed to be about 700 ms. However, it may be varied.

Third Stage

In step S106, phase training of the master transceiver's timing recovery 30 and coefficient convergence of the FFE 10, the FBE 20, the echo canceller 40 and the NEXT canceller 50 are continued (except for the frequency training of the timing recovery 30); meanwhile, In step 208, the convergence of the FFE 10, FBE 20, timing recovery 30, echo canceller 40, and NEXT canceller 50 of the slave transceiver are continued.

Training Complete Stage

In step S107, when the master transceiver's eye-pattern is opened to be larger than a specific range (i.e., the SNR is greater than a first special value such as SNR>27 dB), the step S108 is executed, otherwise, step S101 is returned to.

Since the FFE 10, FBE 20, timing recovery 30, echo canceller 40, and NEXT canceller 50 of both master and slave transceivers may not be turned ON simultaneously all the time, in step S108, the coefficients of the master transceiver's FFE 10, FBE 20, timing recovery 30, echo canceller 40 and NEXT canceller 50 does not have to dynamically adjusted simultaneously during the whole transmitting/receiving process. Thus, the power consumption can be reduced. When the SNR of the master transceiver is greater than a third predetermined value but smaller than the first predetermined value, for example, 27 dB>SNR>20 dB, the step S106 is returned to. When the SNR of the master transceiver is smaller than the second predetermined value, for example, SNR<15 dB, the step S101 is returned to.

In step S209, when the slave transceiver's eye-pattern is opened to be larger than a specific range (i.e., the SNR is greater than a first predetermined value such as SNR>27 dB), the step S210 is executed, otherwise, for example, SNR<15 dB, the step S201 is returned to.

In step S210, the coefficients of the slave transceiver's FFE 10, FBE 20, timing recovery 30, echo canceller 40 and NEXT canceller 50 does not have to dynamically adjusted simultaneously during the whole transmitting/receiving process. Thus, the power consumption can be reduced. When the SNR of the slave transceiver is greater than a third predetermined value but smaller than the first predetermined value, for example, 27 dB>SNR>20 dB, the step S209 is returned to. When the SNR of the slave transceiver is smaller than the second predetermined value, for example, SNR<15 dB, the step S201 is returned to.

Figure 6:
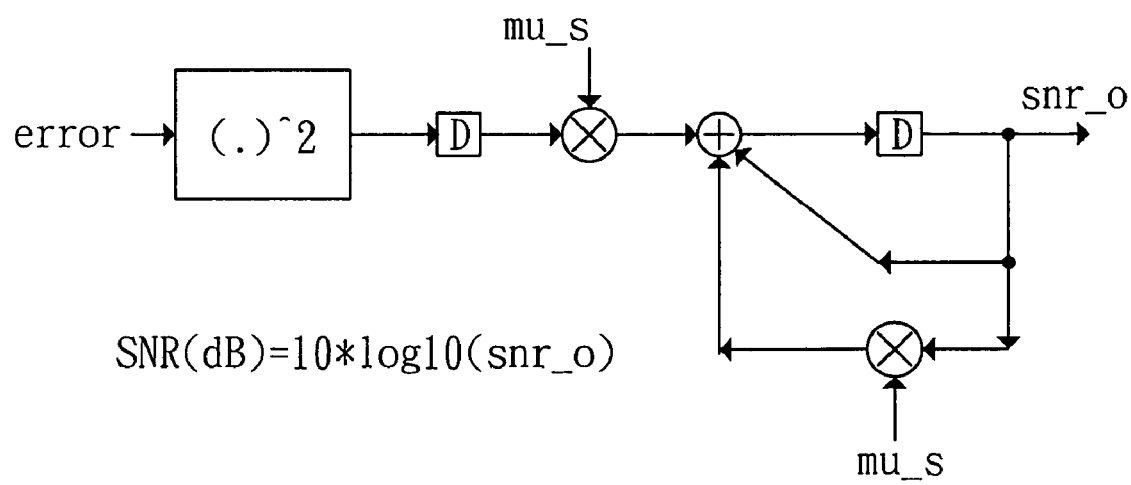
FIG. 6 is a diagram of a signal-to-noise ratio (SNR) computation circuit used in the initialization method according to the invention.

The aforementioned eye-pattern opened indicates the SNR is greater than a specific value. FIG. 6 shows an SNR computing circuit disclosed in the embodiment of the present invention. An SNR is obtained by the SNR computing circuit and accordingly determines if the SNR is greater than a specific value.

As aforementioned, the initialization method for a Gigabit Ethernet system uses channel estimation to pre-estimate coefficients of the FFE 10 and the FBE 20 and thus speeds up the convergence of corresponding function blocks and to avoid divergence caused by the block interaction to each other. Therefore, the system performance and stability are improved.

Although the present invention has been explained in relation to its preferred embodiment, it is to be understood that many other possible modifications and variations can be made without departing from the spirit and scope of the invention as hereinafter claimed.

What is claimed is:

1. An initialization method for use in a communication system having a plurality of transceivers, wherein the transceivers includes a master transceiver and a slave transceiver coupled to the master transceiver via a channel, each of the transceivers respectively having a noise canceller system, a timing recovery, and a equalizer system, the method comprising:

executing a first stage, wherein the first stage at least comprises the steps of:

transmitting a first idle sequence by the master transceiver;

executing signal detection and channel estimation by the slave transceiver;

determining a plurality of initial coefficients of the equalizer system of the slave transceiver according to the result of channel estimation; and training the timing recovery in both frequency and phase and the equalizer system of the slave transceiver;

executing a second stage, wherein the second stage at least comprises the steps of:

transmitting a second idle sequence by the slave transceiver;

executing signal detection and channel estimation by the master transceiver;

determining a plurality of initial coefficients of the equalizer system of the master transceiver according to the result of channel estimation; and training the timing recovery in phase, the equalizer system, and the noise canceller system of the master transceiver while training the noise canceller system of the slave transceiver; and executing a third stage, wherein the third stage at least comprises the steps of:

training the timing recovery in phase, the equalizer system of the master transceiver while training the timing recovery in both frequency and phase and equalizer system of the slave transceivers, wherein the channel estimation executed by the slave transceiver comprises:

generating a first frequency response corresponding to a first frequency and a second frequency response corresponding to a second frequency according to the first idle sequence by the master transceiver; and estimating the channel characteristics according to the first frequency response and the second frequency response; in which the first idle sequence is transmitted at a symbol rate, the first frequency and the second frequency are respectively 1/M and 1/N times of the symbol rate, and M is $2^P$ times of N, wherein M and N are in the order of 2, and P being a natural number, and wherein the channel estimation executed by the master transceiver comprises:

generating a third frequency response corresponding to the first frequency and a fourth frequency response corresponding to the second frequency according to the second idle sequence by the slave transceiver; and estimating the channel characteristics according to the third frequency response and the fourth frequency response; in which the second idle sequence is transmitted at the symbol rate.

2. The initialization method as claimed in claim 1, wherein the step of signal detection and channel estimation is executed before the step of training by the slave transceiver during the first stage.

3. The initialization method as claimed in claim 1, wherein the step of signal detection and channel estimation is executed before the step of training by the master transceiver during the second stage.

4. The initialization method as claimed in claim 1, wherein the step of signal detection in the first stage is for detecting the idle sequence transmitted by the master transceiver and the step of signal detection in the second stage is for detecting the idle sequence transmitted by the slave transceiver.

5. The initialization method as claimed in claim 1, wherein the noise canceller system of each transceiver includes an echo canceller and a NEXT (Near-End Cross-Talk) canceller.

6. The initialization method as claimed in claim 1, wherein the equalizer system of each transceiver includes a FFE (Feed Forward Equalizer) and a FBE (Feed Back Equalizer).

7. The initialization method as claimed in claim 1, wherein the at least one of channel characteristics of the master and slave transceivers includes channel length.

8. The initialization method as claimed in claim 1, wherein when the timing recovery of the slave transceiver is trained in both frequency and phase in the first and the third stage, the frequency and the phase of the timing recovery of the slave transceiver are trained separately.

9. An initialization method for use in a communication system having a plurality of transceivers, wherein the transceivers includes a first transceiver and a second transceiver coupled to the first transceiver via a channel, each of the transceivers respectively having a noise canceller system, a timing recovery, and a equalizer system, the method comprising:

transmitting an idle sequence by the first transceiver;

executing signal detection and channel estimation by the second transceiver;

determining a plurality of initial coefficients of the equalizer system of the second transceiver according to the result of channel estimation; and training the timing recovery, the equalizer system, and the noise canceller system of the second transceiver, wherein the channel estimation comprises:

generating a first frequency response corresponding to a first frequency and a second frequency response corresponding to a second frequency according to the idle sequence by the first transceiver; and estimating the channel characteristics according to the first frequency response and the second frequency response; in which the idle sequence is transmitted at a symbol rate, the first frequency and the second frequency are respectively 1/M and 1/N times of the symbol rate, and M is $2^P$ times of N, wherein M and N are in the order of 2, and P being a natural number.

10. The initialization method as claimed in claim 9, wherein the step of signal detection and channel estimation is executed before the step of training by the second transceiver.

11. The initialization method as claimed in claim 9, wherein the step of signal detection is for detecting the idle sequence transmitted by the first transceiver.

12. The initialization method as claimed in claim 9, wherein the noise canceller system of each transceiver includes an echo canceller and a NEXT (Near-End Cross-Talk) canceller.

13. The initialization method as claimed in claim 9, wherein the equalizer system of each transceiver includes a FFE (Feed Forward Equalizer) and a FBE (Feed Back Equalizer).

14. The initialization method as claimed in claim 9, wherein the channel characteristics includes channel length.

15. The initialization method as claimed in claim 9, wherein the timing recovery, the equalizer system, and the noise canceller system of the second transceiver are trained separately.

16. The initialization method as claimed in claim 9, wherein the equalizer is trained before the noise canceller system and the timing recovery.

17. The initialization method as claimed in claim 9, wherein when the timing recovery is trained, the frequency and the phase of the timing recovery of the second transceiver are trained separately.

18. An initialization method for use in a communication system having at least a transceiver, wherein the transceiver is coupled to other transceiver via a channel, each of the transceivers respectively having a noise canceller system, a timing recovery, and a equalizer system, the method comprising:

executing channel estimation to determine a plurality of initial coefficients of the equalizer system; and training the timing recovery, the equalizer system, and the noise canceller system of the transceiver separately, wherein the channel estimation comprises:

generating a first frequency response corresponding to a first frequency and a second frequency response corresponding to a second frequency according to an idle sequence transmitted by the transceiver; and estimating the channel characteristics according to the first frequency response and the second frequency response; in which the idle sequence is transmitted at a symbol rate, the first frequency and the second frequency are respectively 1/M and 1/N times of the symbol rate, and M is $2^P$ times of N, wherein M and N are in the order of 2, and P being a natural number.

19. The initialization method as claimed in claim 18, wherein the noise canceller system of the transceiver includes an echo canceller and a NEXT (Near-End Cross-Talk) canceller.

20. The initialization method as claimed in claim 18, wherein the equalizer system of the transceiver includes a FFE (Feed Forward Equalizer) and a FBE (Feed Back Equalizer).

21. The initialization method as claimed in claim 18, wherein the step of channel estimation is for estimating channel length.

22. The initialization method as claimed in claim 18, wherein the equalizer is trained before the noise canceller system and the timing recovery.

23. The initialization method as claimed in claim 18, wherein when the timing recovery is trained, the frequency and the phase of the timing recovery of the second transceiver are trained separately.

* * * * *